(12) United States Patent
Mounsaveng et al.

(10) Patent No.: US 11,232,328 B2
(45) Date of Patent: Jan. 25, 2022

(54) METHOD OF AND SYSTEM FOR JOINT DATA AUGMENTATION AND CLASSIFICATION LEARNING

(71) Applicant: Element AI Inc., Montreal (CA)

(72) Inventors: Saypraseuth Mounsaveng, Montreal (CA); David Vazquez Bermudez, Montreal (CA)

(73) Assignee: Element AI Inc., Montreal (CA)

( * ) Notice: Subject to any disclaimer, the term of this patent is extended or adjusted under 35 U.S.C. 154(b) by 168 days.

(21) Appl. No.: 16/778,480

(22) Filed: Jan. 31, 2020

(65) Prior Publication Data

US 2021/0241041 A1    Aug. 5, 2021

(51) Int. Cl.
  *G06K 9/62* (2006.01)
  *G06N 3/08* (2006.01)
  *G06N 3/04* (2006.01)
  *G06T 5/00* (2006.01)
  *G06T 3/00* (2006.01)

(52) U.S. Cl.
  CPC ......... *G06K 9/6262* (2013.01); *G06N 3/0454* (2013.01); *G06N 3/084* (2013.01); *G06T 3/0006* (2013.01); *G06T 5/009* (2013.01); *G06T 2207/20081* (2013.01)

(58) Field of Classification Search
  CPC .... G06K 9/6262; G06N 3/084; G06N 3/0454; G06T 5/009; G06T 3/0006; G06T 2207/20081
  See application file for complete search history.

(56) References Cited

U.S. PATENT DOCUMENTS 10,540,957 B2 *   1/2020   Hannun .............. G06N 3/0454
10,679,044 B2 *   6/2020   Vaezi Joze ............ G06N 20/00

\* cited by examiner

*Primary Examiner* — John W Lee
(74) *Attorney, Agent, or Firm* — Fasken Martineau Dumoulin LLP; Serge LaPointe

(57) ABSTRACT

A method and a system for joint data augmentation and classification learning, where an augmentation network learns to perform transformations and a classification network is trained. A set of labelled images is received. During an inner loop iteration, an augmentation network applies a transformation on a given labelled image of the set to obtain a transformed image. The classification network classifies the transformed image to obtain a predicted class, and a training loss is determined based on the predicted class and the respective label. The parameters of the classification network are updated based on the classification loss. During an outer loop iteration, the classification network classifies another labelled image of the set to obtain another predicted class, and a validation loss is determined based on the other predicted class and the respective label. The parameters of the augmentation network are updated based on the validation loss.

20 Claims, 5 Drawing Sheets

METHOD OF AND SYSTEM FOR JOINT DATA AUGMENTATION AND CLASSIFICATION LEARNING

CROSS-REFERENCE TO RELATED APPLICATIONS

None.

FIELD

The present technology relates to machine learning algorithms (HLAs) in general and more specifically to a method of and a system for joint data augmentation and classification learning.

BACKGROUND

Deep learning methods are based on large models in which the number of parameters is much higher than the dimensionality of the input data as well as the number of available samples. In this setting, overfitting, where a model tailored to a particular dataset is unable to generalise to other datasets is a major problem.

Standard regularization techniques applied directly on the model parameters only add very general knowledge about the parameter values, which leads to modest improvement in the final model accuracy. Adding training samples artificially generated by applying predefined transformations to the initial samples, what is referred to as data augmentation, has shown to be a promising regularization technique to increase a model performance. However, this improvement requires specific domain knowledge about which transformations are suitable for a given dataset. This is not practical, because for each dataset different experts should be consulted to obtain a possibly useful set of transformations. Instead, an ideal learning algorithm should perform well with minimal human intervention/tuning.

A classical example of data augmentation is the inclusion in the training data of the horizontally flipped training images, because we know that in nature the horizontal mirror of an object is visually still a valid object. However, if more specific domains are considered, these assumptions may no longer be valid. For instance, for a dataset of symbols, such as the Greek alphabet, a horizontal mirror of a symbol can generate a non-existing symbol or in some cases even a different symbol of the alphabet, which would confuse the model. A way to deal with this problem is to use expert knowledge to define transformations and select the parameters with validation data.

In practice, the same training is repeated multiple times with different and reasonable transformations (possibly selected by the expert(s)), and the transformations that lead to the best validation accuracy are selected. From a machine learning perspective, this type of validation approach makes more sense because it enables learning the best transformation set from the (validation) data.

However, this approach does not scale. Given a large range of transformations to be tested, retraining the algorithm every time with a different transformation set is computationally burdensome.

SUMMARY

It is an object of one or more embodiments of the present technology to improve at least one of the limitations present in the prior art. One or more embodiments of the present technology may provide and/or broaden the scope of approaches to and/or methods of achieving the aims and objects of the present technology.

One or more embodiments of the present technology have been developed based on developers' appreciation that current approaches for optimizing parameters and hyper-parameters in the context of training, where ranges of values of the parameters and hyper-parameters are tested is time resource consuming.

Developers have appreciated that while some components of a deep learning pipeline can be easily learned by standard gradient descent, it is not the case for data augmentation and more generally regularization. For example, with $l_2$ regularization added to a training loss, the regularization coefficient can be directly minimized on the training data based on gradient descent. However the optimal value will be zero, as regularization always add a positive penalty. This is because the aim of regularization is not to be minimized by the training data but instead to enforce generalization, i.e., avoid overfitting. Thus, all regularization terms, including those in data augmentation should be optimized on new data, which is not seen during training. Developers have appreciated that a machine learning algorithm should learn data augmentation transformations that work well on a validation set.

Developers have realized that a bilevel optimization problem can be formulated, where the objective is to find data augmentation transformations parametrized by transformation parameters that minimize the loss on validation data given the model parameters learned on the training data.

Further, developers have realized that the bilevel optimization problem may be approximated and solved by jointly learning transformation parameters and classification network parameters and using truncated back propagation.

The present technology aims to provide a data augmentation framework by introducing transformations during the training phase that can make the machine learning model at least partially invariant to any transformations that can occur during model deployment, i.e. validation. The present technology enables jointly learning a classifier, used features and transformations to apply on the input data.

In accordance with a broad aspect of the present technology, there is provided a method for learning transformation parameters of an augmentation network for performing data augmentation, the method being executed by a processor, the processor having access to: a classification network for classifying digital documents based on features thereof, the classification network having a set of classification parameters, and the augmentation network for applying transformations on digital documents, the augmentation network having a set of transformation parameters. The method comprises receiving a set of labelled digital documents, each document having a respective class label, receiving a set of noise vectors, applying, by the augmentation network using the set of transformation parameters and a given noise vector of the set of noise vectors, a transformation on a given digital document of the set of digital documents to obtain a transformed digital document. The method comprises classifying, by the classification network, the transformed digital document to obtain a first predicted class and determining, based on the first predicted class of the transformed digital document and the respective class label of the given digital document, a first classification loss indicative of a classification error of the classification network. The method comprises updating, based on the first classification loss, the set of classification parameters to obtain updated values for the set of classification parameters, classifying, by the classification network, another given digital document of the set of labelled digital documents to obtain a second predicted class. The method comprises determining, based on the second predicted class and the respective class label of the other given digital document, a second classification loss indicative of a classification error of the classification network, and updating, based on the second classification loss, the set of transformation parameters of the augmentation network to obtain updated values for the set of transformation parameters.

In some embodiments of the method, the set of labelled digital documents comprises a set of labelled images.

In some embodiments of the method, the set of classification parameters comprise weights of the classification network, and the set of transformation parameters comprise weights of the augmentation network.

In some embodiments of the method, the first classification loss is a training loss calculated using a training loss function, and the second classification loss is a validation loss calculated using a validation loss function.

In some embodiments of the method, the updating the set of transformations parameters is performed using truncated back propagation.

In some embodiments of the method, the method further comprises: applying, by the augmentation network, using the updated values of set of transformation parameters, a transformation on an other given image to obtain an other transformed image. The method further comprises classifying, by the classification network, using the updated values of the set of classification parameters, the other transformed image to obtain a third predicted class label. The method further comprises determining, based on the third predicted class label and the respective class label of the other given image, a third classification loss. The method further comprises updating, based on the third classification loss, the set of classification parameters to obtain other updated values, classifying, by the classification network using the other updated values of the set of classification parameters, another given image of the set of labelled images to obtain a fourth predicted class label. The method further comprises determining, based on the fourth predicted class label and the respective class label of the other given image, a fourth classification loss, and updating, based on the fourth classification loss, the second set of parameters of the augmentation network to obtain second updated values for the set of transformation parameters.

In some embodiments of the method, the augmentation network comprises a multi layer perceptron (MLP)

In some embodiments of the method, the classification network comprises a convolutional neural network (CNN).

In some embodiments of the method, the transformation comprises at least one of: a geometrical transformation, a color transformation, and a mask transformation.

In some embodiments of the method, the geometrical transformation comprises at least one of: rotation, translation, cropping, and zooming.

In some embodiments of the method, the color transformation comprises at least one of: a hue variation, a saturation variation, a contrast variation, and a brightness variation.

In some embodiments of the method, the method further comprises, prior to the receiving the set of noise vectors: generating each noise vector of the set of noise vectors by sampling values from a given distribution.

In accordance with a broad aspect of the present technology, there is provided a method for learning transformation parameters of an augmentation network for performing data augmentation. The method is executed by a processor, and the processor has access to: a classification network for classifying images based on features thereof, the classification network having a set of classification parameters, and the augmentation network for applying transformations on images, the augmentation network having a set of transformation parameters. The method comprises: receiving a set of labelled images, each image having a respective class label and receiving a set of noise vectors. The method comprises applying, by the augmentation network using the set of transformation parameters and a given noise vector of the set of noise vectors, a transformation on a first given image of the set of labelled images to obtain a first transformed image, the first transformed image to be provided for classification to the classification network. The method comprises receiving a validation loss indicative of a performance of the classification network in classifying a second given image from the set of labelled images with respect to the respective label of the second given image, the classification network having classified the second given image using updated values of the set of classification parameters, the updated values having been obtained based on the classification of the first transformed image. The method comprises updating, based on the validation loss, values of the set of transformation parameters to obtain first updated values of the set of transformation parameters.

In some embodiments of the method, the method further comprises applying, by the augmentation network using the first updated values of the set of transformation parameters and an other given noise vector of the set of noise vectors, a transformation on a third given image of the set of labelled images to obtain a second transformed image, the second transformed image to be provided for classification to the classification network. The method further comprises receiving an other validation loss indicative of a performance of the classification network in classifying a fourth given image from the set of labelled images with respect to the respective label of the fourth given image, the classification network having classified the fourth given image using second updated values of the set of classification parameters, the second updated values having been obtained based on the classification of the second transformed image. The method further comprises, based on the other validation loss, the first updated values of the set of transformation parameters to obtain second updated values of the set of transformation parameters.

In accordance with a broad aspect of the present technology, there is provided a system for learning transformation parameters of an augmentation network for performing data augmentation, the system comprising a processor, the processor having access to: a classification network for classifying digital documents based on features thereof, the classification network having a set of classification parameters, and the augmentation network for applying transformations on digital documents, the augmentation network having a set of transformation parameters. The processor is operatively connected to a non-transitory storage medium comprising instructions, the processor, upon executing the instructions, is configured for: receiving a set of labelled digital documents, each document having a respective class label, and receiving a set of noise vectors. The processor is configured for applying, via the augmentation network using the set of transformation parameters and a given noise vector of the set of noise vectors, a transformation on a given digital document of the set of digital documents to obtain a transformed digital document. The processor is configured for classifying, via the classification network, the transformed digital document to obtain a first predicted class. The processor is configured for determining, based on the first predicted class of the transformed digital document and the respective class label of the given digital document, a first classification loss indicative of a classification error of the classification network. The processor is configured for updating, based on the first classification loss, the set of classification parameters to obtain updated values for the set of classification parameters, classifying, by the classification network, another given digital document of the set of labelled digital documents to obtain a second predicted class. The processor is configured for determining, based on the second predicted class and the respective class label of the other given digital document, a second classification loss indicative of a classification error of the classification network, and updating, based on the second classification loss, the set of transformation parameters of the augmentation network to obtain updated values for the set of transformation parameters.

In some embodiments of the system, the set of digital documents comprises a set of labelled images.

In some embodiments of the system, the set of classification parameters comprise weights of the classification network, and the set of transformation parameters comprise weights of the augmentation network.

In some embodiments of the system, the first classification loss is a training loss calculated using a training loss function, and the second classification loss is a validation loss calculated using a validation loss function.

In some embodiments of the system, the updating the set of transformations parameters is performed using truncated back propagation.

In some embodiments of the system, the processor is further configured for: applying, by the augmentation network, using the updated values of set of transformation parameters, a transformation on an other given image to obtain an other transformed image, and classifying, by the classification network, using the updated values of the set of classification parameters, the other transformed image to obtain a third predicted class label. The processor is further configured for determining, based on the third predicted class label and the respective class label of the other given image, a third classification loss. The processor is further configured for updating, based on the third classification loss, the set of classification parameters to obtain other updated values, classifying, by the classification network using the other updated values of the set of classification parameters, another given image of the set of labelled images to obtain a fourth predicted class label. The processor is further configured for determining, based on the fourth predicted class label and the respective class label of the other given image, a fourth classification loss, and updating, based on the fourth classification loss, the set of transformation parameters of the augmentation network to obtain second updated values for the set of transformation parameters.

In some embodiments of the system, the augmentation network comprises a multi layer perceptron (MLP)

In some embodiments of the system, the classification network comprises a convolutional neural network (CNN).

In some embodiments of the system, the transformation comprises at least one of: a geometrical transformation, a color transformation, and a mask transformation.

In some embodiments of the system, the geometrical transformation comprises at least one of: rotation, translation, cropping, and zooming.

In some embodiments of the system, the color transformation comprises at least one of: a hue variation, a saturation variation, a contrast variation, and a brightness variation.

In some embodiments of the system, the processor is further configured for, prior to the receiving the set of noise vectors: generating each noise vector of the set of noise vectors by sampling values from a given distribution.

Definitions

Machine Learning Algorithms (MLA)

A machine learning algorithm (MLA) is a process or sets of procedures that helps a mathematical model adapt to data given an objective. A MLA normally specifies the way the feedback is used to enable the model to learn the appropriate mapping from input to output. The model specifies the mapping function and holds the parameters while the learning algorithm updates the parameters to help the model satisfy the objective.

MLAs may generally be divided into broad categories such as supervised learning, unsupervised learning and reinforcement learning. Supervised learning involves presenting a machine learning algorithm with training data consisting of inputs and outputs labelled by assessors, where the objective is to train the machine learning algorithm such that it learns a general rule for mapping inputs to outputs. Unsupervised learning involves presenting the machine learning algorithm with unlabeled data, where the objective for the machine learning algorithm is to find a structure or hidden patterns in the data. Reinforcement learning involves having an algorithm evolving in a dynamic environment guided only by positive or negative reinforcement.

Non-limiting examples of models used by the MLAs include neural networks (including deep learning (DL) neural network), decision trees, support vector machines (SVMs), Bayesian networks, and genetic algorithms.

Neural Networks (NNs)

Neural networks (NNs), also known as artificial neural networks (ANNs) are a class of non-linear models mapping from inputs to outputs and comprised of layers that can potentially learn useful representations for predicting the outputs. Neural networks are typically organized in layers, which are made of a number of interconnected nodes that contain activation functions. Patterns may be presented to the network via an input layer connected to hidden layers, and processing may be done via the weighted connections of nodes. The answer is then output by an output layer connected to the hidden layers. Non-limiting examples of neural networks includes: perceptrons, back-propagation, Hopfield networks.

Multilayer Perceptron (MLP)

A multilayer perceptron (MLP) is a class of feedforward artificial neural networks. A MLP consists of at least three layers of nodes: an input layer, a hidden layer and an output layer. Except for the input nodes, each node is a neuron that uses a nonlinear activation function. A MLP uses a supervised learning technique called backpropagation for training. A MLP can distinguish data that is not linearly separable.

Convolutional Neural Network (CNN)

A convolutional neural network (CNN or ConvNet) is a NN which is a regularized version of a MLP. A CNN uses convolution in place of general matrix multiplication in at least one layer.

Recurrent Neural Network (RNN)

A recurrent neural network (RNN) is a NN where connection between nodes form a directed graph along a temporal sequence. This allows it to exhibit temporal dynamic behavior. Each node in a given layer is connected with a directed (one-way) connection to every other node in the next successive layer. Each node (neuron) has a time-varying real-valued activation. Each connection (synapse) has a modifiable real-valued weight. Nodes are either input nodes (receiving data from outside the network), output nodes (yielding results), or hidden nodes (that modify the data en route from input to output).

Examples of deep learning MLAs include: Deep Boltzmann Machine (DBM), Deep Belief Networks (DBN), Convolutional Neural Network (CNN), and Stacked Auto-Encoders.

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document may include the document itself (i.e. its contents), or it may be a unique document descriptor identifying a file with respect to a particular file system, or some other means of directing the recipient of the indication to a network location, memory address, database table, or other location where the file may be accessed. As one skilled in the art will appreciate, the degree of precision required in such an indication depends on the extent of any prior understanding about the interpretation to be given to information being exchanged as between the sender and the recipient of the indication. For example, if it will be appreciated that prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it will be appreciated that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It will be appreciated that some aspects of the present technology that have resulted from attempting to attain the above-mentioned object may not satisfy this object and/or may satisfy other objects not specifically recited herein.

Additional and/or alternative features, aspects and advantages of implementations of one or more embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
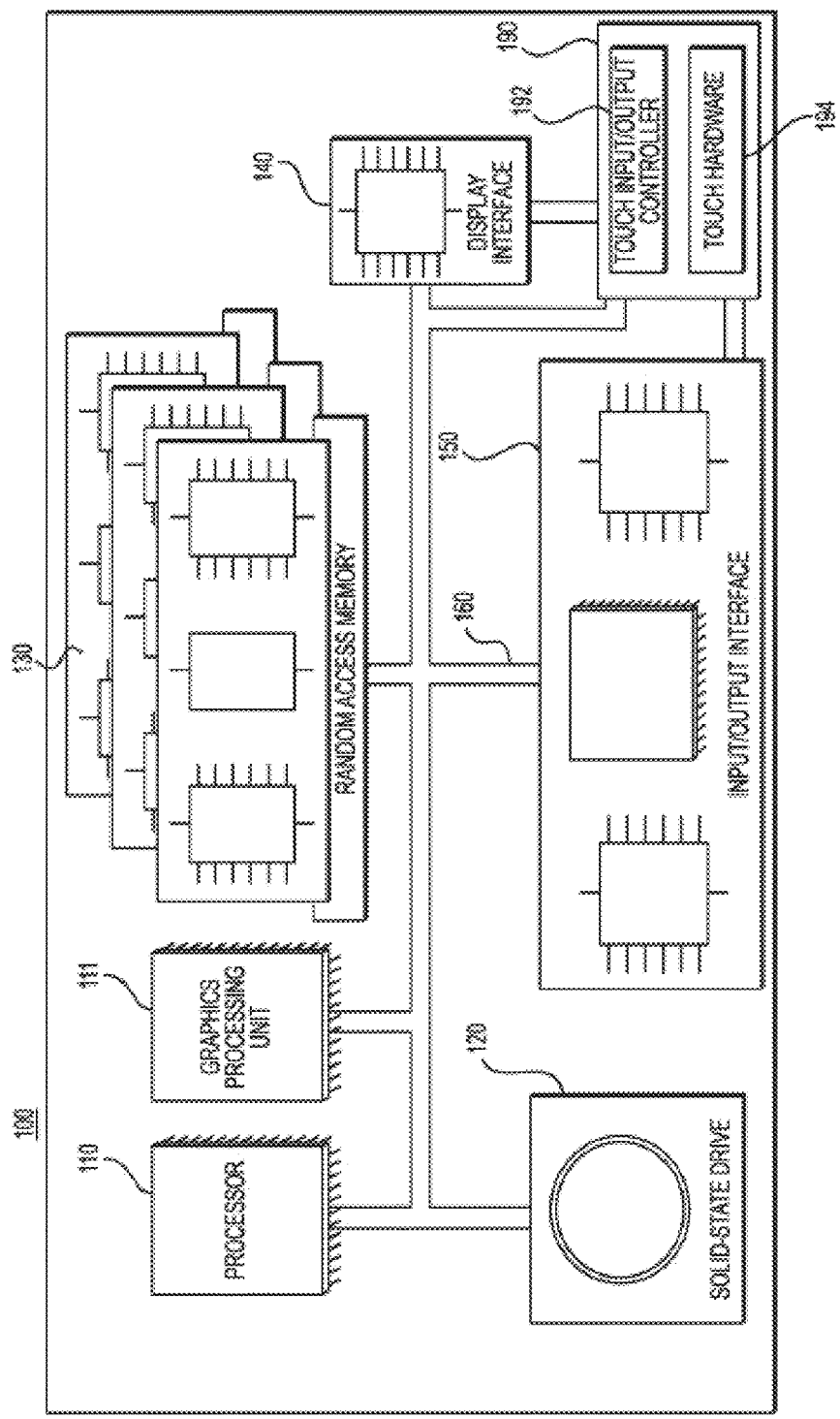
FIG. 1 depicts a schematic diagram of an electronic device in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology.

Furthermore, as an aid to understanding, the following description may describe relatively simplified implementations of the present technology. As a person skilled in the art will appreciate, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by the skilled addressee that any block diagram herein represents conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Now referring to FIG. 1, there is shown an electronic device 100 suitable for use with one or more implementations of the present technology, the electronic device 100 comprises various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiment illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) enabling the user to interact with the electronic device 100 in addition or in replacement of the touchscreen 190.

According to one or more implementations of the present technology, the solid-state drive 120 stores program instructions suitable for being loaded into the random-access memory 130 and executed by the processor 110 and/or the GPU 111 for jointly learning transformation parameters of a transformation network and classification network parameters of a classification network. For example, the program instructions may be part of a library or an application.

It will be appreciated that the electronic device 100 may be implemented as a server, a desktop computer, a laptop computer, a tablet, a smartphone, a personal digital assistant or any device that may be configured to implement the present technology, as it may be appreciated by a person skilled in the art.

System

Figure 2:
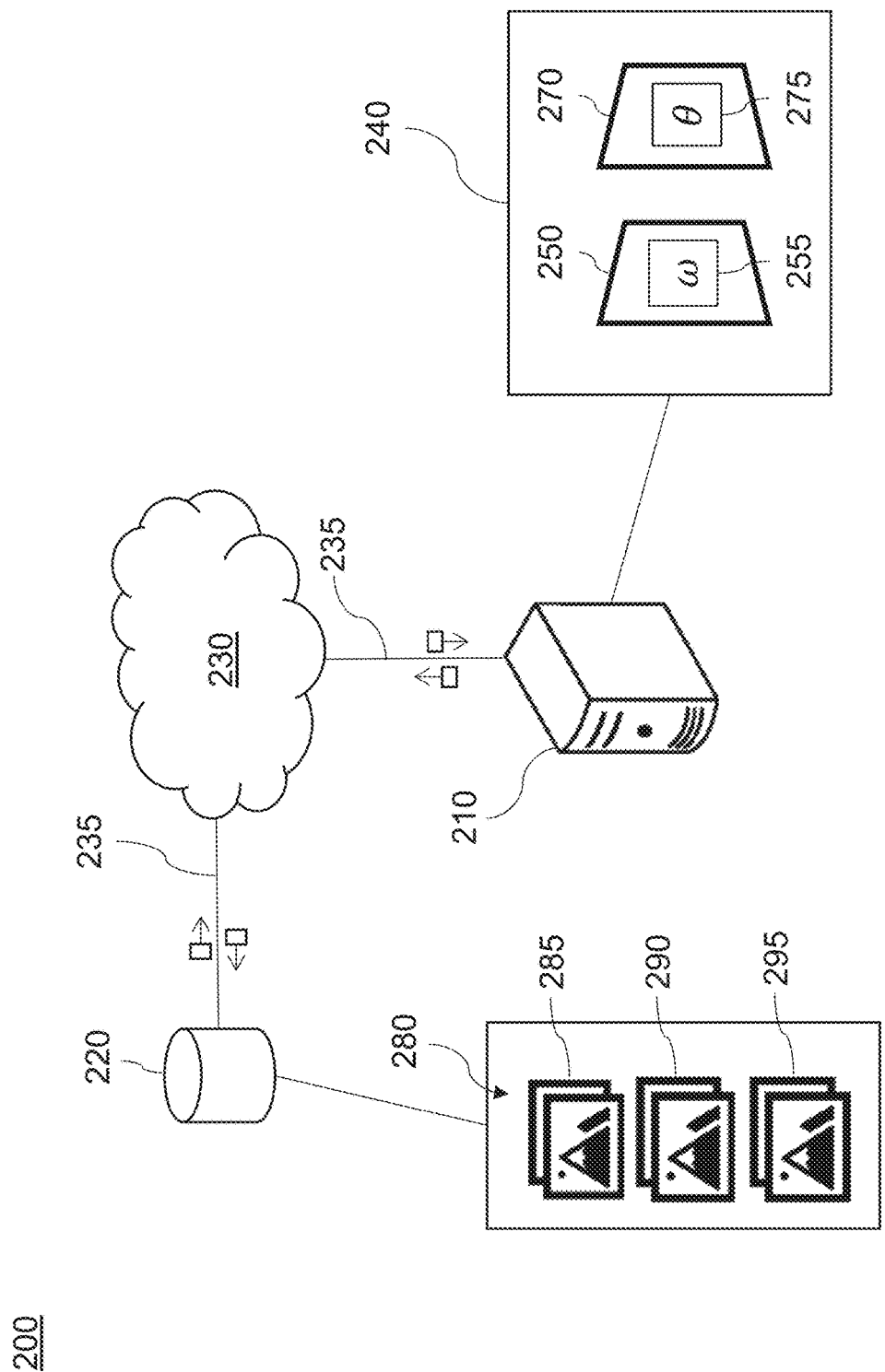
FIG. 2 depicts a schematic diagram of a system in accordance with one or more non-limiting embodiments of the present technology.

Now referring to FIG. 2, there is shown a schematic diagram of a system 200, the system 200 being suitable for implementing one or more non-limiting embodiments of the present technology. It will be appreciated that the system 200 as shown is merely an illustrative implementation of the present technology. Thus, the description thereof that follows is intended to be only a description of illustrative examples of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art will understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art will appreciate, this is likely not the case. In addition, it will be appreciated that the system 200 may provide in certain instances simple implementations of one or more embodiments of the present technology, and that where such is the case they have been presented in this manner as an aid to understanding.

The system 200 comprises inter alia a training server 210, and a database 220, communicatively coupled over a communications network 230 via respective communication links 245.

Training Server

The training server 210 is configured to: (i) access a set of machine learning algorithms (MLAs) 240; and (ii) train the set of MLAs 240.

How the training server 210 is configured to do so will be explained in more detail herein below.

It will be appreciated that the training server 210 can be implemented as a conventional computer server and may comprise at least some of the features of the electronic device 100 shown in FIG. 1. In a non-limiting example of one or more embodiments of the present technology, the training server 210 is implemented as a server running an operating system. Needless to say that the training server 210 may be implemented in any other suitable hardware and/or software and/or firmware or a combination thereof. In the disclosed non-limiting embodiment of present technology, the training server 210 is a single server. In one or more alternative non-limiting embodiments of the present technology, the functionality of the training server 210 may be distributed and may be implemented via multiple servers (not shown).

It will be appreciated that the implementation of the training server 210 is well known to the person skilled in the art. However, the training server 210 comprises a communication interface (not shown) configured to communicate with various entities (such as the database 220, for example and other devices potentially coupled to the communication network 230) via the network. The training server 210 further comprises at least one computer processor (e.g., the processor 110 of the electronic device 100) operationally connected with the communication interface and structured and configured to execute various processes to be described herein.

Machine Learning Algorithms (MLAs)

The training server 210 has access to the set of MLAs 240.

The set of MLAs 240 includes inter alia a classification network 250, and an augmentation network 270.

The classification network 250 is configured to classify digital documents based on features thereof.

In one or more embodiments, the classification network 250 is configured to classify digital documents in the form of digital images. It is contemplated that the classification network 250 may modified and used to classify documents including text, images, and sound or a combination thereof.

The classification network 250 is a deep neural network. In one or more embodiments, the classification network 250 includes a convolutional neural network (CNN).

The implementation of the classification network 250 is known in the art, and the classification network 250 may be implemented as any type of classifier without departing from the scope of the present technology.

The classification network 250 is configured according to a set of classification parameters 255, of which at least a portion are updated during a training phase of the classification network 250.

The set of classification parameters 255 updated during the training, i.e. network weights of the classification network 250, are also referred to as learned parameters.

The set of classification parameters 255 include inter alia hyperparameters.

Hyperparameters are parameters having values that are set before the training of the classification network 250 begins, and include model hyperparameters, which specify the topology of the network, and training hyperparameters, which specify how the network is trained.

Model hyperparameters include inter alia number of hidden units $n_h$, weight decay $\lambda$, sparsity of activation $\alpha$, neuron non-linearity, weights initialization scaling coefficient, random seeds, and preprocessing.

Training hyperparameters include inter alia initial learning rate $\in_0$, learning rate schedule $\in_t$, mini-batch size B, number of training iterations T, momentum $\beta$, and layer-specific optimization hyper-parameters.

The set of classification parameters 255 include network weights of the classification network 250.

The classification network 250 is trained on a loss function using gradient descent. In one or more embodiments, the loss function is a classification loss function. Non-limiting examples include: cross-entropy, hinge, negative log likelihood, margin classifier, and soft margin classifier.

As a non-limiting example, the classification network 250 may be implemented as one of: BadGAN and ResNet18. BadGAN has a CNN architecture including 9 convolutional layers with Leaky ReLUs and a MLP classifier. ResNet18 is 18 layer deep neural network with residual connections.

The augmentation network 270, also known as augmenter network or transformation network, is configured to: (i) receive a given labelled digital document having a class label; (ii) receive a noise vector; and (iii) apply a transformation on the digital document using the noise vector to obtain a transformed digital document while preserving class information, i.e. the class label of the transformed digital document should be predictable and the same as the untransformed digital document.

As will be described herein below, the augmentation network 270 is configured to apply transformations on digital documents in the form of digital images, which will be referred to as images.

The augmentation network 270 is a neural network that is parametrized by a set of transformation parameters 275. The set of transformation parameters 275 are learnable parameters such as weights, i.e. their values are updated during validation of the augmentation network 270.

In the context of the present technology, the augmentation network 270 is a differentiable network on which gradient descent may be performed.

The augmentation network 270 applies transformations on images, where the transformations include one or more of: geometrical transformations, color transformations, and mask transformations.

In one or more embodiments, for the geometrical transformations, the augmentation network 270 outputs 6 parameters that are then reshaped in a 2×3 matrix representing the parameters of an affine transformation. In one or more embodiments, the geometrical transformations include affine transformations (a rotation, a translation, cropping, and zooming).

In one or more embodiments, for the color transformations, the augmentation network 270 outputs a scalar for each transformation representing the intensity of the transformation. In one or more embodiments, the color transformations include one or more of: a hue variation, a saturation variation, a contrast variation, and a brightness variation of pixels in the image. It is contemplated that the color transformations may include color space transformations such as isolating color channels.

A mask transformation is a pixel mask applied on an image and having the same size as the image.

In one or more embodiments, for the mask transformation, the augmentation network 270 outputs a 1D vector with a size equal to the number of pixels of the image, and the 1D vector is then reshaped to a 2D vector of the same size as the image.

In one or more embodiments, the mask transformations include differentiable version of a cutout transformation.

It is contemplated that the augmentation network 270 may perform other types of transformation which preserve class information without departing from the scope of the present technology.

In one or more embodiments, the training server 210 may execute one or more of the set of MLAs 240. In one or more alternative embodiments, one or more the set of MLAs 240 may be executed by another server (not depicted), and the training server 210 may access the one or more of the set of MLAs 240 for training or for use by connecting to the server (not shown) via an API (not depicted), and specify parameters of the one or more of the set of MLAs 240, transmit data to and/or receive data from the one or more of the set of MLAs 240, without directly executing the one or more of the set of MLAs 240.

As a non-limiting example, one or more of the set of MLAs 240 may be hosted on a cloud service providing a machine learning API.

How the MLAs in the set of MLA 240 are trained will be explained herein below.

Database

A database 220 is communicatively coupled to the training server 210 via the communications network 230 but, in one or more alternative implementations, the database 220 may be communicatively coupled to the training server 210 without departing from the teachings of the present technology. Although the database 220 is illustrated schematically herein as a single entity, it will be appreciated that the database 220 may be configured in a distributed manner, for example, the database 220 may have different components, each component being configured for a particular kind of retrieval therefrom or storage therein.

The database 220 may be a structured collection of data, irrespective of its particular structure or the computer hardware on which data is stored, implemented or otherwise rendered available for use. The database 220 may reside on the same hardware as a process that stores or makes use of the information stored in the database 220 or it may reside on separate hardware, such as on the training server 210. The database 220 may receive data from the training server 210 for storage thereof and may provide stored data to the training server 210 for use thereof.

In one or more embodiments of the present technology, the database 220 is configured to store: (i) the set of MLAs 240; (i) a set of labelled digital documents in the form of a set of labelled images 280 including: a subset of training images 285, a subset of validation images 290, and a subset of testing images 295; and (ii) parameters of the set of MLAs 240.

The set of labelled images 280 includes digital images having been labelled. Each labelled image may represent a scene with one or more respective objects, at least one of which is labelled with a respective class label and used for training the set of MLAs 240. It will be appreciated that the number of classes in the set of labelled images 280 is not limited.

The set of labelled images 280 is divided into three subsets: the subset of training images 285, the subset of validation images 290, and the subset of testing images 295. It will be appreciated that the set of labelled images 280 may be split into subsets having different numbers of labelled images depending on the number of labelled images in the set of labelled images 280

Communication Network

In one or more embodiments of the present technology, the communications network 230 is the Internet. In one or more alternative non-limiting embodiments, the communication network 230 may be implemented as any suitable local area network (LAN), wide area network (WAN), a private communication network or the like. It will be appreciated that implementations for the communication network 230 are for illustration purposes only. How a communication link 235 (not separately numbered) between the training server 210, the database 220, and/or another electronic device (not shown) and the communications network 230 is implemented will depend inter alia on how each electronic device is implemented.

Data Augmentation Learning Procedure

Figure 3:
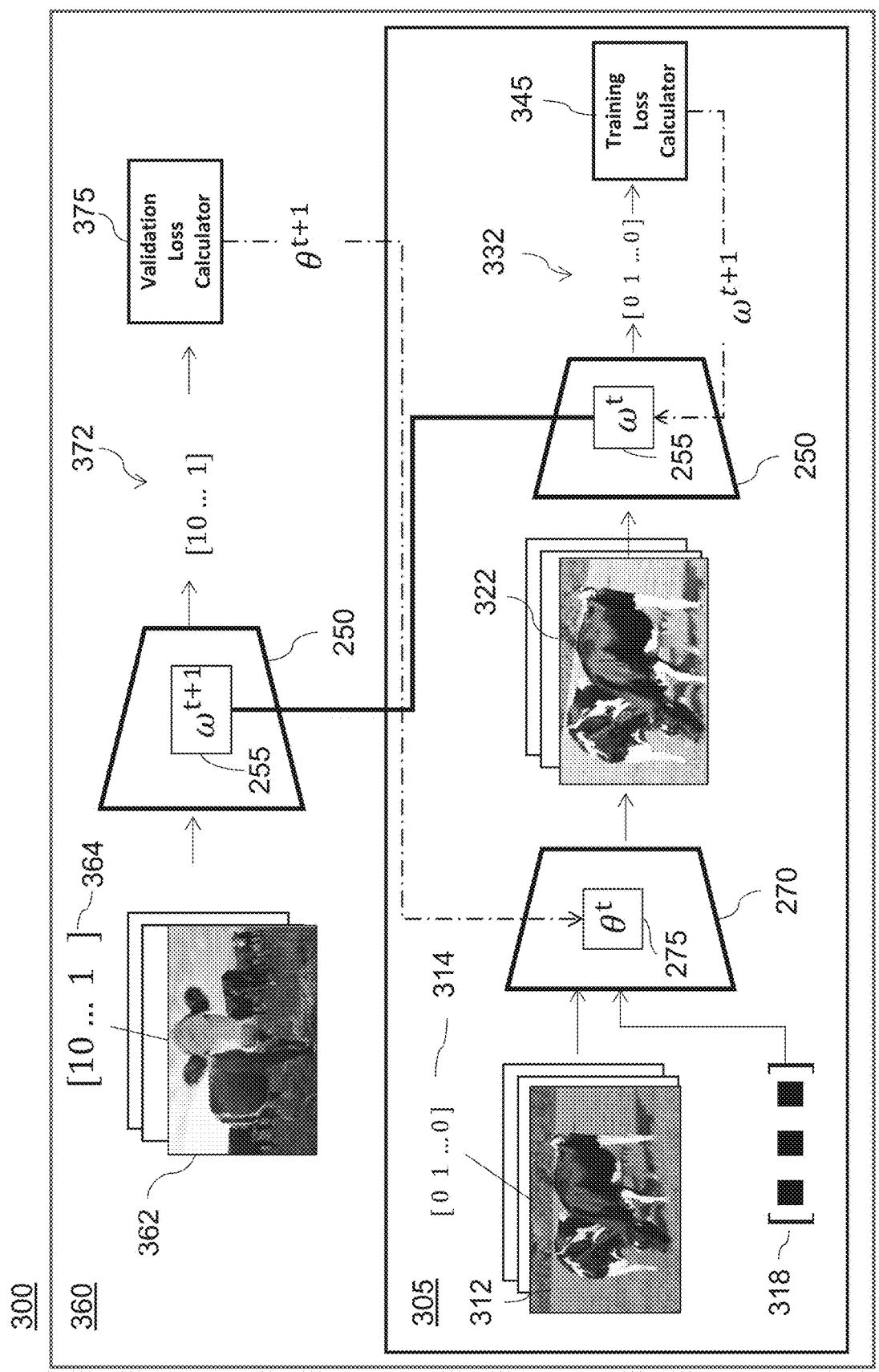
FIG. 3 depicts a schematic diagram of data augmentation learning procedure in accordance with one or more non-limiting embodiments of the present technology.

With reference to FIG. 3 there is shown a schematic diagram of a data augmentation learning procedure 300 in accordance with one or more non-limiting embodiments of the present technology.

The data augmentation learning procedure 300 is executed by the training server 210. It will be appreciated that the data augmentation learning procedure 300 may be executed by another electronic device comprising a processor such as the processor 110 or the GPU 111. In one or more other embodiments, the data augmentation learning procedure 300 is executed in a distributed manner.

The data augmentation learning procedure 300 is an online learning procedure, where parameters of the models, i.e. of the classification network 250 and the augmentation network 270 are updated jointly by performing training iterations and validation iterations.

Online Bilevel Optimization

The purpose of the data augmentation learning procedure 300 is to automatically learn data augmentation transformations (i.e. find optimal values for the set of transformation parameters 275 of the augmentation network 270) that generalize well on unseen data and which also maximize performance of a network (i.e. find optimal values for the set of classification parameters 255 of the classification network 250).

The data augmentation learning procedure 300 aims to learn to solve a bilevel optimization problem in which data augmentation transformations $\mathcal{A}$ parametrized by optimal values of the set of transformation parameters 275 represented by $\theta^*$ that minimize the loss $\mathcal{L}$ on the validation data $X_{val}$ given optimal values of the set of classification parameters 265 represented by $W^*$ learned on the training data $X_{tr}$, which is expressed by equations (1) and (2):

$$\theta^* = \underset{\theta}{\mathrm{argmin}}\, \mathcal{L}(X_{val}, W^*) \quad (1)$$

$$\text{s.t.} \quad W^* = \underset{W}{\mathrm{argmin}}\, \mathcal{L}(\mathcal{A}_\theta(X_{tr}), W) \quad (2)$$

where $\theta^*$ are optimal values of the set of transformation parameters 275, $\mathcal{L}$ is a loss function, $X_{val}$ is the validation data or subset of validation images X, $W^*$ are optimal values of the set of classification parameters 255, $\mathcal{A}$ are data augmentation transformations performed by the augmentation network 270 using the set of transformation parameters 275.

Thus, the aim is to learn the augmentation network 270 parametrized by the set of transformation parameters 275 which defines a distribution of transformations that should be applied on the training data to improve generalization, where the set of transformation parameters 275 may include a thousand parameters.

Generally speaking, gradient descent is used to optimize parameters of a network. However, in this case the transformations that need to be optimized on a validation data are applied only on the training data, where first order approximation would not work. The purpose of data augmentation is to introduce transformations during the training phase that can make the model invariant or partially invariant to any transformations that can occur during the validation phase. If the transformations are applied on the validation data, the parameters learned by the model will select the transformation parameters that make the data easier to model independently of the data distribution.

To obtain the right validation loss, the classification network 250 should be trained until convergence, and then the training must be unrolled back to back propagate the gradient of the set of transformation parameters 275 of the augmentation network 270. However, as this process is time consuming, due to the amount of epochs needed until converge, and memory consuming, as all intermediate steps of the training need to be stored, truncated back propagation is performed.

Truncated back propagation enables obtaining an estimation of the state of the classification network 250 at convergence and the right validation loss by applying one step of gradient descent on the classification network 250, instead of a plurality of iterations (e.g. hundreds) as with gradient descent.

Thus, the data augmentation learning procedure 300 enables approximating the bilevel optimization problem in the case of a differentiable augmentation network 270 parametrized by the set of transformation parameters 275 by performing truncated back propagation.

The bilevel optimization problem of equations (1) and (2) may be solved by iteratively solving equation (2) and finding the optimal set of transformation parameters 275 represented by $\theta$. The set of classification parameters 265 represented by W are shared between the training data and validation data, i.e. the classification network 250, and the chain rule can be used to differentiate the validation loss $\mathcal{L}(X_{val}, W^*)$ with respect to the set of transformation parameters 275 represented by $\theta$. Gradient information is exploited due to optimal values of the set of classification parameters 265 represented by $W^*$ being shared between the validation loss and the training loss.

The gradient of the validation loss with respect to the set of transformation parameters 275 represented by $\theta$ is expressed as equations (3-5):

$$\nabla_\theta \mathcal{L}(x_{val}, W^*) = \frac{\partial \mathcal{L}(x_{val}, W^*)}{\partial \theta} \quad (3)$$

$$\nabla_\theta \mathcal{L}(x_{val}, W^*) = \frac{\partial \mathcal{L}(X_{val}, W^*)}{\partial W^*} \cdot \frac{\partial W^*(\mathcal{A}_\theta(X_{tr}))}{\partial \theta}$$

$$\frac{\partial W^*}{\partial \theta} = \sum_{i=0}^{T-1} \frac{\partial W^{(T)}}{\partial W^{(i)}} \cdot \frac{\partial W^{(i)}}{\partial G^{(i-1)}} \cdot \frac{\partial G^{(i-1)}}{\partial \theta^{(i)}} \quad (4)$$

$$\frac{\partial W^{(T)}}{\partial W^{(i)}} = \prod_{j=i}^{T-1} \frac{\partial W^{(j+1)}}{\partial W^{(j)}} \quad (5)$$

where $\nabla_\theta \mathcal{L}(X_{val}, W^*)$ is the gradient loss, $G^{(t)} = \nabla_W \mathcal{L} \mathcal{A}_\theta(X_{tr}), W^t)$ and T is the iterations at which the training has converged ($W^* = W^T$).

It will be appreciated that following the chain rule, the gradient of the validation loss given validation data $X_{val}$ and optimal values of the set of classification parameters 255 with respect to the set of transformation parameters 275 can be expressed as: the gradient of the validation loss given $X_{val}$ and the optimal values of the set of classification parameters 255 with respect to the optimal values of the set of classification parameters 255 multiplied by the gradient of the set of classification parameters 255 given augmented training data $\mathcal{A}_\theta(X_{tr})$ with respect to the set of transformation parameters 275.

As W* represents optimal values of the set of classification parameters 255 at training convergence, the values depend on θ for each iteration of gradient descent. Thus, to compute $$\frac{\partial W^*}{\partial \theta},$$

back-propagation through the entire T iteration of the training cycle is required. However, it will be appreciated that this approach may be performed only for small problems due to the large requirements in terms of computation and memory.

The estimation of W* is an iterative procedure, and instead of computing $$\frac{\partial W^*}{\partial \theta}$$

only at the end of the training cycle, it may be estimated at every training iteration t, as expressed by equation (6):

$$\frac{\partial W^{(t)}}{\partial \theta} = \sum_{i=0}^{t} \frac{\partial W^{(t)}}{\partial W^{(i)}} \cdot \frac{\partial W^{(i)}}{\partial G^{(i-1)}} \cdot \frac{\partial G^{(i-1)}}{\partial \theta^{(i)}} \quad (6)$$

It will be appreciated that this corresponds to a dynamic change of the set of transformation parameters 275 represented by θ during the training iterations, i.e. θ becomes $\theta^{(t)}$ to minimize the current validation loss based on the past learning history. This enables adapting data transformations dynamically with the evolution of the training.

It will be appreciated that the bilevel optimization cannot be written as a single unconstrained formulation in which the constraint in W* is summed with a multiplicative factor that is maximized (i.e. by using Lagrange multipliers), because the upper level optimization should be performed only on the set of transformation parameters 275 represented by θ, while the lower level optimization should be performed only on the set of classification parameters 255 represented by W. Equation (6) also shows that the cost of calculating $$\frac{\partial W^{(t)}}{\partial \theta}$$

grows with the number of iterations t.

Thus, truncated back propagation is used to make the gradient computation constant at each iteration, which is expressed as equation (7):

$$\frac{\partial W^{(t)}}{\partial \theta} \approx \sum_{i=t-K}^{t} \frac{\partial W^{(t)}}{\partial W^{(i)}} \cdot \frac{\partial W^{(i)}}{\partial G^{(i-1)}} \cdot \frac{\partial G^{(i-1)}}{\partial \theta^{(i)}} \quad (7)$$

where K is a number of gradient unfolding used. As a non-limiting example, K=1.

The data augmentation learning procedure 300 learns values for a set of transformation parameters 275 that define a distribution of transformation performed by the augmentation network 270 which may be applied on the training data to improve generalization of the classification network 250.

Thus, the data augmentation learning procedure 300 jointly learns parameters of a classification network, and parameters of an augmentation network.

The data augmentation learning procedure 300 adapts the data augmentation transformations by updating dynamically the set of transformation parameters 275 with the evolution of the training of the classification network 250.

Backpropagation is used for adjusting each weight in a network in proportion to how much it contributes to overall error, i.e. by iteratively reducing each weight's error, weight values producing good predictions may be obtained.

The data augmentation learning procedure 300 executes a training loop or inner loop including a set of training iterations (only one training loop iteration 305 illustrated in FIG. 3) and a validation loop or outer loop including a set of validation iterations (only one validation loop iteration 360 illustrated in FIG. 3).

It will be appreciated that the data augmentation learning procedure 300 executes the validation loop iteration 360 after the training loop iteration 305, as opposed to executing a training loop until convergence and subsequently executing a validation loop.

In one or more embodiments, the validation loop iteration 360 may be executed after each training loop iteration 305 (i.e. K=1). In one or more alternative embodiments, the validation loop iteration 360 may be executed after a given number of training loop iterations 305 (i.e., K>1).

The data augmentation learning procedure 300 receives the set of labelled images 280. In one or more embodiments, the set of labelled images 280 is received from the database 220. In one or more alternative embodiments, the set of labelled images 280 is received from another electronic device. The set of labelled images 280 includes the subset of training images 285, the subset of validation images 290, and the subset of testing images 295.

The data augmentation learning procedure 300 receives a set of noise vectors (only one noise vector 318 depicted in FIG. 3). The set of noise vectors may be generated using techniques known in the art. A given noise vector of the set of noise vectors may be used during training to expand the size of the training dataset. A given noise vector 318 is a vector including random numerical values sampled from a distribution. Each element of the vector may correspond to a random value from the distribution. In one or more alternative embodiments, elements of a given noise vector may be sampled from different distributions.

It will be appreciated that a noise vector is used for learning a distribution of transformations by the augmentation network 270.

The data augmentation learning procedure 300 initializes the set of MLAs 240 including the classification network 250 and the augmentation network 270 before starting training. In one or more embodiments, the set of classification parameters 255 and/or the set of transformation parameters 275 are initialized with random values.

The data augmentation learning procedure 300 executes a training loop iteration 305 as part of a set of training loop iterations.

Training Loop Iteration

At each training loop iteration 305, a given training image 312 is received from the subset of training images 285. The given training image 312 is annotated or labelled with a class label 314 indicative of a class of one or more objects depicted in the image.

While the training loop iteration 305 is described with respect to a single given training image 312, it will be appreciated that during two or more images may be received from the subset of training images 285

In the non-limiting example depicted in FIG. 3, the given training image 312 depicts two cows in a field and has a class label 314 corresponding to "cow".

In one or more embodiments, a noise vector 318 is received from the set of noise vectors (not depicted).

The augmentation network 270 has current values of the set of transformation parameters 275, i.e. values having been determined at the previous iteration t−1.

At each training loop iteration 305, the augmentation network 270 receives as an input the given training image 312 and applies a transformation on the given training image 312 to obtain a respective augmented or transformed training image 322. The augmentation network 270 applies a transformation on the given training image 312 vector using the noise vector 318.

It will be appreciated that the transformation performed by the augmentation network 270 may be any type of transformation that preserves the class information of a given image.

The transformations are performed according to the current values of the set of transformation parameters 275.

In the non-limiting example depicted herein, the transformed training image 322 has been obtained by modifying brightness, contrast, and by zooming, and cropping the given training image 312.

The classification network 250 receives as an input the transformed training image 322.

In one or more embodiments, the classification network 250 extracts a set of image features from the transformed training image 322 to perform classification and output a class prediction 332. The classification network 250 performs the classification of the according to current values of the set of classification parameters 255, i.e. values at the current training loop iteration 305 (which have been determined at the previous loop iteration).

The classification network 250 outputs a class prediction 332 for the transformed training image 322.

At each training loop iteration 305, the training loss calculator 345 receives the respective class prediction 332 for the transformed training image 322 and the class label 314 of the given training image 312.

At each training loop iteration 305, the training loss calculator 345 uses a training loss function to calculate a training loss of the respective class prediction 332 for the transformed training image 322

The training loss is a performance metric which enables evaluating a performance of the current values of the set of classification parameters 255 of the classification network 250 based on: the respective class prediction 332 performed on the transformed training image 322, and the provided class label 314 of the given training image 312.

The training loss function is a classification loss function. In one or more embodiments, the training loss function is a cross-entropy.

In one or more embodiments, the training loss at iteration t is expressed as equation (8):

$$L_{tr}^{(t)} = \mathcal{L}(\mathcal{A}_{\theta(t)}(X_{tr}), W^{(t)}) \quad (8)$$

Where $\mathcal{L}$ is the training loss function, $\mathcal{A}_\theta(X_{tr})$ is the transformed training image 322 generated by the augmentation network 270 using θ the set of transformation parameters 275 at iteration t on the training data $X_{tr}$, represented by the given training image 312, and $W^{(t)}$ is the set of classification parameters 255 at iteration t.

The data augmentation learning procedure 300 updates the current values of the set of classification parameters 255 of the classification network 250 based on the current training loss to obtain updated values of the set of classification parameters 255. It will be appreciated that one or more values of the set of classification parameters 255 are updated depending on the current training loss.

The updated values of the set of classification parameters 255 are used by the classification network 250 to perform classification on another transformed training image (not depicted) generated by the augmentation network 270 based on another given training image (not depicted) of the subset of training images 285 during a subsequent training loop iteration 305.

At each training loop iteration 305, the updated values of the set of classification parameters 255 are shared with the classification network 250 used during the validation loop iteration 360. The updated values of the set of classification parameter 255 obtained during the training loop iteration 305 are used for performing predictions on validation images of the subset of validation images 290 during the validation loop iteration 360.

It will be appreciated that in one or more alternative embodiments, the data augmentation learning procedure 300 may perform one or more training loop iterations similar to the training loop iteration 305 before proceeding with the validation loop iteration 360.

The data augmentation learning procedure 300 executes a verification loop iteration 360 as part of a set of verification loop iterations.

Validation Loop Iteration

At each validation loop iteration 360, a given validation image 362 is received from the subset of validation images 290. It is contemplated that in one or more alternative embodiments, two or more validation images may be received from the subset the subset of validation images 290. The given validation image 362 is annotated or labelled with a validation class label 364 indicative of a class of one or more objects depicted in the validation image 362.

At each validation loop iteration 360, the classification network 250 receives as an input the given validation image 362.

The classification network 250 has the updated values of the set of classification parameters 255 which have been obtained based on the training loss computed based on the respective class prediction 332 of the transformed training image 322 and the class label 314 of the given training image 312.

The classification network 250 classifies the given validation image 362 to obtain a validation class prediction 372. It will be appreciated that the given validation image is not transformed by the augmentation network 270, and during the validation loop iteration 360, the classification network 250 performs a class prediction using values of classification parameters obtained using the augmentation network 270.

At each validation loop iteration 360, the validation loss calculator 375 determines a current validation loss 375 based on the validation class prediction 372 and the validation class label 364 of the given validation image 362. The validation loss function is similar to the training loss function.

The validation loss is a performance metric which enables evaluating a performance of the updated values of the set of classification parameters 255 based on: the validation class prediction 372 of the given validation image 362 and the validation class label 364 of the given validation image 362.

In one or more embodiments, the validation loss at iteration t is expressed as equation (9):

$$L_{val}^{(t)} = \mathcal{L}(X_{val}, W^{(t)}) \quad (9)$$

Where $\mathcal{L}$ is the validation loss function, $X_{val}$ is the validation data and $W^{(t)}$ is the set of classification parameters 255 at iteration t.

At each validation loop iteration 360, the data augmentation learning procedure 300 updates the current values of the set of transformation parameters 275 of the augmentation network 270 based on the current validation loss to obtain updated values of the set of transformation parameters 275. It will be appreciated that one or more values of the set of transformation parameters 275 are updated depending on the current validation loss.

It will be appreciated that the validation loss function is similar to the training loss function, however in the context of the present technology, the validation loss calculated using the validation loss function at each validation loop iteration 360 is used for updating values of the set of transformation parameters 275 of the augmentation network 270, while the training loss calculated at each iteration of the training loop iteration 305 is used for updating values of the set of classification parameters 255 of the classification network 250.

The updated values of the set of transformation parameters 275 obtained during the validation loop iteration 360 are used for applying transformations by the augmentation network 270 during a subsequent training loop iteration 305.

The data augmentation learning procedure 300 then executes a subsequent training loop iteration 305, i.e. iteration t+1, with the updated values of the set of transformation parameters 275 obtained at iteration t of the validation loop and the updated values of the set of classification parameters 255 obtained at iteration t of training loop. The data augmentation learning procedure 300 updates values of the set of classification parameters 255 at iteration t+1 of the training loop and executes a validation loop iteration to update the set of transformation parameters 275.

The data augmentation learning procedure 300 is executed until convergence. It will be appreciated that the number of training epochs is defined during the model design phase as a hyperparameter, and at the end of the training one or more models with the highest classification accuracy on subset of validation images 290 are selected to be used.

At the end of the data augmentation learning procedure 300, the set of classification parameters 255 have optimal values (as determined by the training loss function). The set of transformation parameters 275 are fine-tuned to the last training iteration.

After the data augmentation learning procedure 300, the classification network 250 may be used to classify images. It is contemplated that the classification network 250 may be used to classify documents other than images by modifying the data augmentation procedure 300 without departing from the scope of the present technology.

The training server 210 may then execute a testing procedure on the subset of test images to assess the performance of the classification network 250 having optimal values of the set of classification parameters 255.

It will be appreciated that the data augmentation learning procedure 300 approximates a bilevel optimization problem with truncated back propagation, which enables efficiently estimating a large number of parameters to generate optimal data augmentation transformations by gradient descent (as compared to prior methods), and obtaining an online estimation of the optimal data augmentation during the different phases of training, while also changing training data to adapt to different validation conditions.

Figure 4:
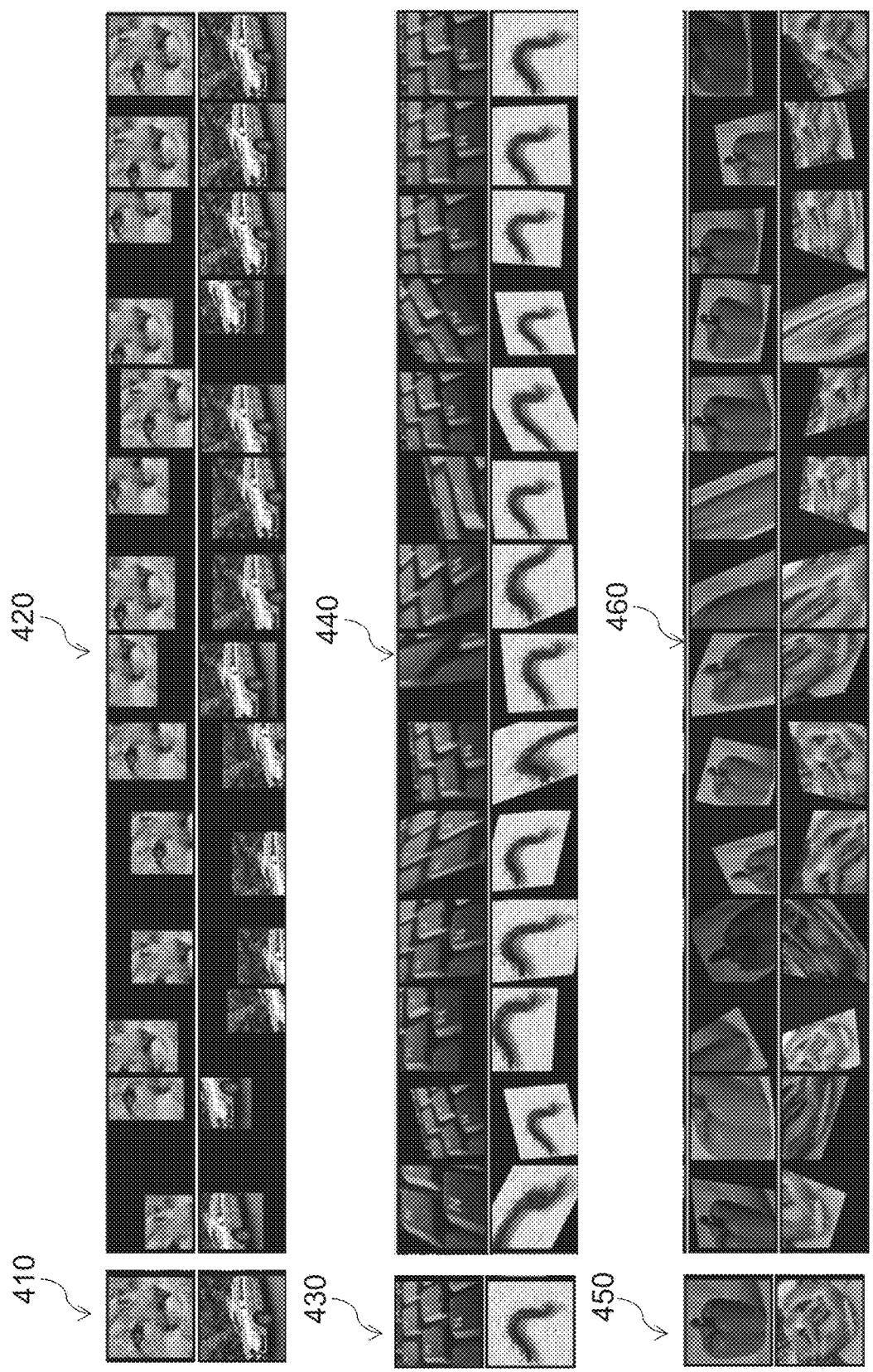
FIG. 4 depicts non-limiting examples of transformations performed on images from the Tiny ImageNet dataset in accordance with one or more non-limiting embodiments of the present technology.

FIG. 4 depicts non-limiting examples of a set of transformations 420, 440, 460 performed on training images 410, 430, 450 from the Tiny ImageNet dataset at different training epochs in accordance with one or more non-limiting embodiments of the present technology.

The transformations of the images have been performed by the augmentation network 270 during training thereof.

A first subset of training images 410 is shown, on which the augmentation network 270 has performed a set of learnt translations transformations 420 at different training epochs.

A second subset training images 430 is shown, on which the augmentation network 270 has applied a set of learnt affine transformations 440 at different training epochs.

A third subset of training image 450 is shown, on which the augmentation network 270 has applied a set of learnt affine transformations 440 at different training epochs.

Method Description

Figure 5:
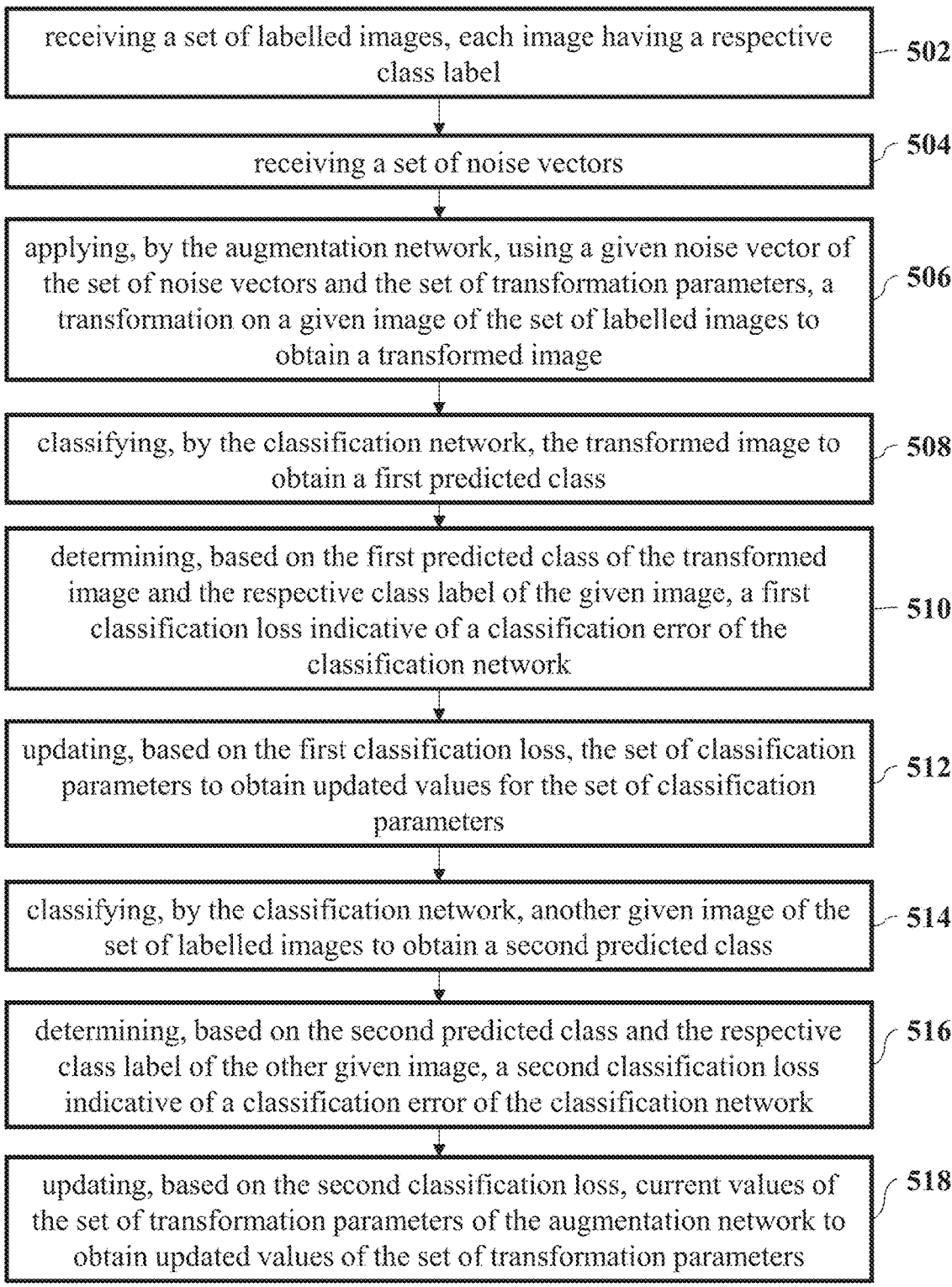
FIG. 5 depicts a flow chart of a method of jointly learning transformation parameters of an augmentation network and classification network parameters of a classification network in accordance with one or more non-limiting embodiments of the present technology.

FIG. 5 depicts a flowchart of a method 500 of jointly learning transformation parameters of the augmentation network 270 and classification parameters of the classification network 250, the method 500 being executed in accordance with one or more non-limiting embodiments of the present technology.

The training server 210 comprises a processor 110 and a non-transitory computer readable storage medium such as the solid-state drive 120 and/or the random-access memory 130 storing computer-readable instructions. The processor 110, upon executing the computer-readable instructions, is configured to execute the method 500.

The training server 210 has access to the set of MLAs 240 including the classification network 250 and the augmentation network 270.

The training server 210 initializes the classification network 250 and the augmentation network 270.

The method 500 is described with respect to labelled digital images, however it is contemplated that the method 500 may be modifier and implemented to be executed with other types of labelled digital documents which may include images and/or text and/or processed audio without departing from the scope of the present technology.

The method 500 begins at processing step 502.

According to processing step 502, the processor 110 of the training server 210 receives the set of labelled images 280. The set of labelled images 280 includes the subset of training images 285, the subset of validation images 290, and the subset of testing images 295. In one or more embodiments, the processor 110 receives the set of labelled images 280 from the solid-state drive 120 and/or the random access memory 130.

The data augmentation learning procedure 300 receives a set of noise vectors (only one noise vector 318 depicted in FIG. 3). The set of noise vectors may be generated using techniques known in the art. A given noise vector of the set of noise vectors may be used during training to expand the size of the training dataset In one or more embodiments, the training server 210 initializes the set of MLAS 240 including the classification network 250 and the augmentation network 270.

According to processing step 504, the processor 110 of the training server 210 receives a set of noise vectors.

According to processing step 506, the augmentation network 270 applies a transformation on a given training image 312 of the subset of training images 285 using a given noise vector from the set of noise vectors to obtain a transformed training image 322.

The augmentation network 270 has current values of the set of transformation parameters 275.

In one or more embodiments, the augmentation network 270 applies at least one of: a geometrical transformation, a color transformation, and a mask transformation.

In one or more embodiments, the augmentation network 270 applies the transformation on the given training image 312 of the subset of training images 285 to obtain the transformed training image 322 without using a noise vector.

According to processing step 508, the classification network 250 having current values of the set of classification parameters 255 classifies the transformed training image 322 to obtain a respective class prediction 332. The classification network 250 performs the classification based on features of the transformed training image 322.

According to processing step 510, the processor 110 of the training server 210 determines a training loss based on: the respective class prediction 332 performed on the transformed training image 322 and the class label 314 of the given training image 332.

The processor 110 of the training server 210 uses a training loss function to calculate the training loss.

According to processing step 512, the processor 110 of the training server 210 updates the current values of the set of classification parameters 255 of the classification network 250 based on the current training loss to obtain updated values of the set of classification parameters 255. The processor 110 shares the updated values of the set of classification parameters 255 with the classification network 250. In one or more embodiments, the set of classification parameters 255 are the classification network weights.

According to processing step 514, the classification network 250 receives as an input a given validation image 362 from the subset of validation images 290 of the set of labelled images 280 and classifies the given validation image 362 to obtain a validation class prediction 372. The classification network 250 has the updated values of the set of classification parameters 255 which have been obtained at processing step 512.

According to processing step 516, the processor 110 of the training server 210 determines a current validation loss based on the validation class prediction 372 and the validation class label 364 of the given validation image 362. The validation loss function is similar to the training loss function.

According to processing step 518, the processor of the training server 210 updates the current values of the set of transformation parameters 275 of the augmentation network 270 based on the current validation loss to obtain updated values of the set of transformation parameters 275.

Processing steps 504 to 518 are repeated iteratively on other training images and validation images of the set of labelled images 310 to update or learn values of the set of transformation parameters 275 and the set of classification parameters 255 until convergence.

The method 500 ends.

One or more non-limiting embodiments of the present technology have been implemented and tested on different datasets, as detailed herein below.

Experiments

Datasets

During experiments three different datasets have been considered: CIFAR10, CIFAR100, and Tiny ImageNet. CIFAR10 is a dataset is composed of 32×32 natural color images from 10 different classes. This dataset is split into a training set of 50,000 images and a test set of 10,000 images. CIFAR100 is an extension of CIFAR10 dataset which contains the same number of images, but distributed in 100 classes instead of 10. Finally, Tiny ImageNet is a subset of the ImageNet dataset containing 200 classes. Each class has 500 training images, 50 validation images, and 50 test images. Since the test set labels are not available, the validation set has been used as test set and 20% of the training set has been used as a validation set. The image size is 64×64.

Implementation Details

To facilitate fair comparison to previous works, the classification network 250 has been implemented as two different classifiers: BadGAN and ResNet18. BadGAN is a simple CNN based architecture composed by 9 convolutional layers with LeakyReLUs and a MLP classifier. ResNet18 is a 18 layers deep neural network with residual connections.

The augmentation network 270 for the geometric and color transformation is implemented as a MLP that receives input noise and generates the output parameters. Three sizes were experimented with. The small has an input and output size of n, the number of hyper-parameters to optimize, and it has two layers with n and 10n neurons. The medium has an input size of 100 and two layers of 64 and 32 neurons. The large has an input size of 100 and four layers of 512, 1024, 124 and 512 neurons. The mask augmenter is an up-sampling decoder with 4 transposed convolutions of 8, 8, 16 and 32 channels.

Although in principle separate validation set for training the augmenter were needed, in practice, the training data has been used. However, the batch of samples used to learn the augmenter has to be different than the one used for learning the classifier. This ensures that the model learns data augmentation parameters that generalize well. Experiments have been performed with K=1 the frequency of updating 61 and the number of steps of back-propagation K=J=1. The only predefined transformation used by the model of the present technology is the horizontal flip as it is useful but not differentiable.

Experiments compares the performance of different classifiers without data augmentation (baselines), the same classifiers with the best known hyper-parameters for data augmentation (predefined), state of the art methods and the trained classification network 250 of the present technology.

Geometrical Transformations

TABLE 1

Geometric data augmentation. Accuracy and training cost of different data augmentation approaches considering only translation and affine transformations

| CIFAR10 | ResNet18 | | |
| --- | --- | --- | --- |
| | Transf. | Affine | Cost |
| Baseline | 88.55 | 88.55 | 1 |
| Predefined | 95.28 | 94.59 | >10 |
| Transf. invariant | 92.14 | 90.31 | 1.1 |
| Validated magnitude | 94.58 | 93.43 | 11.5 |
| Augmentation network | 95.35 | 95.21 | 5.3 |

The goal of the first experiment is to assess the utility of the geometric transformations learned by the present technology for the classification task. In Table 1 performance of the present technology on CIFAR10 (with ResNet18) against several baselines in terms of accuracy and training cost for translation and affine transformations are compared. In order to have a reference performance, the baseline has been defined as the result of a training without any data augmentation and the cost of its training time was considered as 1. Then, the accuracy of a classifier trained with predefined geometric data augmentation transformations was reported. In this case, for translation, the standard setting for CIFAR10 was used: flip and random translation between −4 and 4 pixels along x and y. For the estimation of the training cost of this setting, in the general case the best data augmentation setting was not known and many different augmentation values were tested. For instance, for translation two values have to be defined. For affine six values have been defined. It is clear that a grid or random search can take many iterations (in the table>10). Another interesting experiment is to use the augmentation network 270 to be transformation invariant in the sense that the transformation generated by the augmenter is applied on training as well as on test and the update of the set of transformation parameters 275 θ is done on the same data as the update of the set of classification parameters 255 W. This means that instead of finding the best data augmentation, the best transformation have been found which reduces the training loss. For instance if the discriminative part of an image is in the center, it is expected that the method will learn to zoom in the image. This approach is similar to the spatial transformer networks. It has a very low computational cost (1.1, just the overhead of applying the augmenter) and its accuracy is better than not using any data augmentation, but far from a model trained with a good data augmentation. A model (validated magnitude) that selects only a single parameter that defines the magnitude of the transformation parameters from which an actual transformation is sampled from was considered. For instance for affine transformations, the six parameters were generated as values sampled from a uniform distribution U(−M, M), with M selected based on the performance of a trained model on the validation set. The last row of Table 1 presents the results of the present technology.

TABLE 2

Architectures. Accuracy of the present technology for different augmentation network and classification network architectures.

| | CIFAR-10 | | | |
|---|---|---|---|---|
| | BadGan | | ResNet18 | |
| Aug.-Class. | Tr. | Aff. | Tr. | Aff. |
| Small | 93.65 | 93.62 | 95.35 | 95.21 |
| Medium | 93.75 | 93.63 | 95.25 | 95.16 |
| Large | 93.65 | 93.39 | 95.00 | 94.83 |

In Table 2, the influence of size of the augmentation network 270 and the classification network 250 on the model performance was investigated. Results show that a large classifier (from BadGAN to ResNet18) improves the performance. Instead, the size of the augmenter network does not have a significant impact on the accuracy of the classifier. Thus, in the following experiments, a small augmenter was used as it was faster.

Color and Mask Transformations

The goal of the experiment is to evaluate the impact of color and mask transformations and their combinations with affine transformations. In Table 3, results for predefined transformations for color and color and affine transformation (using the default settings for CIFAR10) are reported. For transformations involving mask, a predefined baseline was not reported due to the difficulty of finding predefined masks. For the combination of different transformations, as expected, the best result is obtained when all transformations are used.

TABLE 3

Combinations of color, mask and affine transformations. Accuracy of the present technology on color and mask transformations and in combination with affine.

| | ResNet18 | | | | |
|---|---|---|---|---|---|
| CIFAR10 | Color | Mask | Color + Aff. | Color + Mask | Color + Mask + Affin. |
| Predefined | 91.82 | — | 94.96 | — | — |
| Present Technology | 92.70 | 91.98 | 94.99 | 92.70 | 95.42 |

Evaluation on Different Datasets

In this experiment, the present approach has been evaluated on different datasets. In Table 4, the present technology is compared to predefined transformations on the three datasets considered already for the Affine transformations, and when adding color and mask transformations (Full). This shows that the present approach can be applied to datasets with different characteristics.

TABLE 4

Evaluation on different datasets. The performance of the model of the present technology on three different datasets with either affine or full (affine + color + mask) transformations is compared.

| | CIFAR10 | CIFAR100 | Tiny ImageNet |
|---|---|---|---|
| Baseline | 88.55 | 68.99 | 59.69 |
| Predefined | 94.69 | 73.61 | 61.10 |
| Present Technology (affine) | 95.16 | 74.31 | 62.92 |
| Present Technology (full) | 95.42 | 76.21 | 63.61 |

TABLE 5

Comparison with SotA and the present technology based on affine, color, and mask transformations

| | Classifier | CIFAR10 | CIFAR100 |
|---|---|---|---|
| Baseline | ResNet18 | 88.55 | 68.99 |
| Predefined | ResNet18 | 94.69 | 73.61 |
| Bayesian DA | ResNet18 | 91.00 | 72.10 |
| DAN | BadGAN | 93.00 | — |
| TANDA | ResNet56 | 94.40 | — |
| AutoAugment | ResNet32 | 95.50 | — |
| Present Technology | ResNet18 | 95.42 | 74.31 |

It will be appreciated that one or more embodiments of the present technology aim to expand a range of technical solutions for addressing a particular technical problem, namely improving performance of machine learning models by automatically and jointly learning an augmentation network and training a classification network. The augmentation network enables generating additional training data for training the classification network, which reduce overfitting of the model for performing predictions, while also enable saving computational resources and computational time.

It will be appreciated that not all technical effects mentioned herein need to be enjoyed in each and every embodiment of the present technology. For example, one or more non-limiting embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting.

The invention claimed is:

1. A method for learning transformation parameters of an augmentation network for performing data augmentation, the method being executed by a processor, the processor having access to:
   a classification network for classifying digital documents based on features thereof, the classification network having a set of classification parameters,
   the augmentation network for applying transformations on digital documents, the augmentation network having a set of transformation parameters,
the method comprising:
   receiving a set of labelled digital documents, each document having a respective class label;
   receiving a set of noise vectors;
   applying, by the augmentation network using the set of transformation parameters and a given noise vector of the set of noise vectors, a transformation on a given digital document of the set of digital documents to obtain a transformed digital document;
   classifying, by the classification network, the transformed digital document to obtain a first predicted class;
   determining, based on the first predicted class of the transformed digital document and the respective class label of the given digital document, a first classification loss indicative of a classification error of the classification network;
   updating, based on the first classification loss, the set of classification parameters to obtain updated values for the set of classification parameters;
   classifying, by the classification network, another given digital document of the set of labelled digital documents to obtain a second predicted class;
   determining, based on the second predicted class and the respective class label of the other given digital document, a second classification loss indicative of a classification error of the classification network; and
   updating, based on the second classification loss, the set of transformation parameters of the augmentation network to obtain updated values for the set of transformation parameters.

2. The method of claim 1, wherein the set of labelled digital documents comprises a set of labelled images.

3. The method of claim 2, wherein
the set of classification parameters comprise weights of the classification network; and wherein
the set of transformation parameters comprise weights of the augmentation network.

4. The method of claim 2, wherein
the first classification loss is a training loss calculated using a training loss function; and wherein
the second classification loss is a validation loss calculated using a validation loss function.

5. The method of claim 4, wherein the updating the set of transformations parameters is performed using truncated back propagation.

6. The method of claim 1, further comprising:
   applying, by the augmentation network, using the updated values of set of transformation parameters, a transformation on an other given image to obtain an other transformed image;
   classifying, by the classification network, using the updated values of the set of classification parameters, the other transformed image to obtain a third predicted class label;
   determining, based on the third predicted class label and the respective class label of the other given image, a third classification loss;
   updating, based on the third classification loss, the set of classification parameters to obtain other updated values;
   classifying, by the classification network using the other updated values of the set of classification parameters, another given image of the set of labelled images to obtain a fourth predicted class label;
   determining, based on the fourth predicted class label and the respective class label of the other given image, a fourth classification loss; and
   updating, based on the fourth classification loss, the second set of parameters of the augmentation network to obtain second updated values for the set of transformation parameters.

7. The method of claim 1, wherein the augmentation network comprises a multi layer perceptron (MLP).

8. The method of claim 1, wherein the classification network comprises a convolutional neural network (CNN).

9. The method of claim 1, wherein the transformation comprises at least one of: a geometrical transformation, a color transformation, and a mask transformation.

10. The method of claim 9, wherein the geometrical transformation comprises at least one of: rotation, translation, cropping, and zooming.

11. The method of claim 9, wherein the color transformation comprises at least one of: a hue variation, a saturation variation, a contrast variation, and a brightness variation.

12. A method for learning transformation parameters of an augmentation network for performing data augmentation, the method being executed by a processor, the processor having access to:
   a classification network for classifying images based on features thereof, the classification network having a set of classification parameters,
   the augmentation network for applying transformations on images, the augmentation network having a set of transformation parameters,
the method comprising:
   receiving a set of labelled images, each image having a respective class label;
   receiving a set of noise vectors;
   applying, by the augmentation network using the set of transformation parameters and a given noise vector of the set of noise vectors, a transformation on a first given image of the set of labelled images to obtain a first transformed image, the first transformed image to be provided for classification to the classification network;

receiving a validation loss indicative of a performance of the classification network in classifying a second given image from the set of labelled images with respect to the respective label of the second given image, the classification network having classified the second given image using updated values of the set of classification parameters, the updated values having been obtained based on the classification of the first transformed image; and updating, based on the validation loss, values of the set of transformation parameters to obtain first updated values of the set of transformation parameters.

13. A system for learning transformation parameters of an augmentation network for performing data augmentation, the system comprising a processor, the processor having access to:

a classification network for classifying digital documents based on features thereof, the classification network having a set of classification parameters, the augmentation network for applying transformations on digital documents, the augmentation network having a set of transformation parameters, the processor being operatively connected to a non-transitory storage medium comprising instructions;

the processor, upon executing the instructions, being configured for:

receiving a set of labelled digital documents, each document having a respective class label;

receiving a set of noise vectors;

applying, via the augmentation network using the set of transformation parameters and a given noise vector of the set of noise vectors, a transformation on a given digital document of the set of digital documents to obtain a transformed digital document;

classifying, via the classification network, the transformed digital document to obtain a first predicted class;

determining, based on the first predicted class of the transformed digital document and the respective class label of the given digital document, a first classification loss indicative of a classification error of the classification network;

updating, based on the first classification loss, the set of classification parameters to obtain updated values for the set of classification parameters;

classifying, by the classification network, another given digital document of the set of labelled digital documents to obtain a second predicted class;

determining, based on the second predicted class and the respective class label of the other given digital document, a second classification loss indicative of a classification error of the classification network; and updating, based on the second classification loss, the set of transformation parameters of the augmentation network to obtain updated values for the set of transformation parameters.

14. The system of claim 13, wherein the set of digital documents comprises a set of labelled images.

15. The system of claim 14, wherein the set of classification parameters comprise weights of the classification network;

and wherein the set of transformation parameters comprise weights of the augmentation network.

16. The system of claim 14, wherein the first classification loss is a training loss calculated using a training loss function; and wherein the second classification loss is a validation loss calculated using a validation loss function.

17. The system of claim 16, wherein the updating the set of transformations parameters is performed using truncated back propagation.

18. The system of claim 13, wherein the processor is further configured for:

applying, by the augmentation network, using the updated values of set of transformation parameters, a transformation on an other given image to obtain an other transformed image;

classifying, by the classification network, using the updated values of the set of classification parameters, the other transformed image to obtain a third predicted class label;

determining, based on the third predicted class label and the respective class label of the other given image, a third classification loss;

updating, based on the third classification loss, the set of classification parameters to obtain other updated values;

classifying, by the classification network using the other updated values of the set of classification parameters, another given image of the set of labelled images to obtain a fourth predicted class label;

determining, based on the fourth predicted class label and the respective class label of the other given image, a fourth classification loss; and updating, based on the fourth classification loss, the set of transformation parameters of the augmentation network to obtain second updated values for the set of transformation parameters.

19. The system of claim 13, wherein the transformation comprises at least one of: a geometrical transformation, a color transformation, and a mask transformation.

20. The system of claim 19, wherein the geometrical transformation comprises at least one of: rotation, translation, cropping, and zooming.

* * * * *

UNITED STATES PATENT AND TRADEMARK OFFICE
CERTIFICATE OF CORRECTION

| | | |
|---|---|---|
| PATENT NO. | : 11,232,328 B2 | Page 1 of 1 |
| APPLICATION NO. | : 16/778480 | |
| DATED | : January 25, 2022 | |
| INVENTOR(S) | : Saypraseuth Mounsaveng et al. | |

It is certified that error appears in the above-identified patent and that said Letters Patent is hereby corrected as shown below:

On the Title Page

Item (72), should read:
MOUNSAVENG, Saypraseuth
Montreal, CANADA
VAZQUEZ BERMUDEZ, David
Montreal, CANADA
PEDERSOLI, Marco
Montreal, CANADA
LARADJI, Issam Hadj
Montreal, CANADA Signed and Sealed this
Twenty-fourth Day of December, 2024

Derrick Brent
*Acting Director of the United States Patent and Trademark Office*